United States Patent [19]

Calizzano et al.

[11] 3,751,604

[45] Aug. 7, 1973

[54] AUTOMATIC CONTROL SYSTEM FOR LOADING AND UNLOADING MAGNETIC TAPES IN DIGITAL RECORDER EQUIPMENTS

[75] Inventors: Fernand Calizzano, Groslay; Michel Chauvel, Chatenay-Malabry; Jean Mallière, Antony; Jean Rybner, Paris, all of France

[73] Assignee: Compagnie Internationale pour L'Informatique, Louverciennes, France

[22] Filed: July 12, 1971

[21] Appl. No.: 161,436

[30] Foreign Application Priority Data

July 15, 1970 France .............................. 7026002

[52] U.S. Cl... 179/100.2 PM, 179/100.2 S, 242/182

[51] Int. Cl. ....................... G11b 15/58, G11b 15/52

[58] Field of Search ............... 179/100.2, 100.2 PM, 179/100.2 S, 100.2 Z; 242/182–185; 226/24

[56] References Cited

UNITED STATES PATENTS

| | | | |
|---|---|---|---|
| 3,617,650 | 11/1971 | Morello | 242/182 |
| 3,393,878 | 7/1968 | Aweida | 242/182 |
| 3,545,700 | 12/1970 | Klang | 242/184 |
| 3,225,990 | 12/1965 | Barbeau | 242/182 |
| 3,619,625 | 11/1971 | Wood | 179/100.2 S |
| 3,643,890 | 2/1972 | Milligan | 242/182 |

*Primary Examiner*—Bernard Konick
*Assistant Examiner*—Jay P. Lucas
*Attorney*—Kemon, Palmer & Estabrook

[57] ABSTRACT

An automatic control system for loading and unloading a magnetic tape receiver coil from and to a delivery coil in a digital recorder equipment having a tape driving capstan at an intermediate location between upstream and downstream depression wells having outlets connected to a main suction duct comprises means in such a connection for enabling selective applications of reduced depressions and/or outer atmosphere pressure to said wells and a hardwared programme arrangement which is monitored from the response of sensors detecting the presence or absence of the magnetic tape at a number of selected positions along its normal path between the delivery and receiver coils for ensuring, during a loading operation, an automatic formation of magnetic tape loops within said wells and, during an unloading operation, an automatic release of such loops from said wells, and for controlling the ends of both loading and unloading automatic operations.

14 Claims, 7 Drawing Figures

AUTOMATIC CONTROL SYSTEM FOR LOADING AND UNLOADING MAGNETIC TAPES IN DIGITAL RECORDER EQUIPMENTS

BRIEF SUMMARY OF THE INVENTION:

The present invention concerns improvements in or relating to the automatic loading and unloading operations of a magnetic tape to and from a receiver coil in a digital recorder equipment wherein a tape driving capstan is located between an upstream well and a downstream well within which said magnetic tape is due to present loops of automatically maintained lengthes from the action of servo-arrangements which control the respective rotations of the delivery coil and of the receiver coil of the equipment, which servo-arrangements are monitored from sensors of the conditions of the magnetic tape loops within said wells; both the upstream and the downstream wells having outlets connected to a main suction duct for creating the depressions therein.

It is the object of the invention to provide an automatic control system for loading and unloading a magnetic tape receiver coil in such a kind of digital magnetic tape recorder equipment which will appreciably restrict the manual interventions of an operator to the following steps:

for a loading operation, the setting of the receiver coil and the presentation to this coil of a free end of a magnetic tape drawn from the delivery coil which has been preset on the recorder equipment;

for an unloading operation, the final grasp of the free end of the magnetic tape and the removal of the tape loaded delivery coil:

and of course the keyings initiating the automatic loading and unloading operations proper.

In an automatic control system according to the invention, means are provided for controllably reducing the depressions in the wells and/or connecting said wells to the outer atmosphere and means are provided for controlling a reduced depression value in the downstream well during the beginning of the automatic loading operation and for controlling the connection of both wells to the outer atmosphere during the end of an automatic unloading operation.

Figure 2:
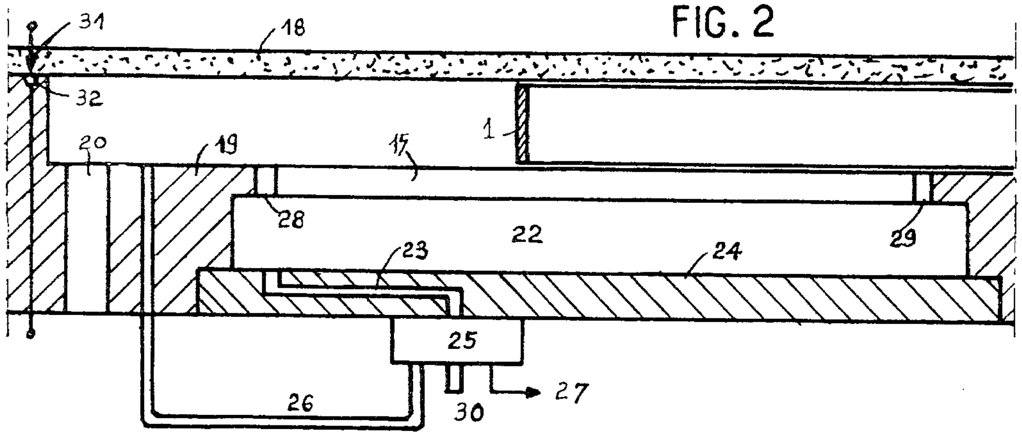
FIG. 2 shows a cross-section view of a depression well adapted to the purposes of the invention.

DETAILED DESCRIPTION:

The magnetic tape of the digital recorder equipment, when loaded, normally passes from a delivery coil 2 to a receiver coil 3 with a loop within an upstream well 4, a passage on a driving capstan 5 and a loop within a downstream well 6. It may be guided by such rollers as 7 (before entering the upstream well) and 8 (at the output of the downstream well). It is normally applied onto a block of magnetic heads 9, provided for instance near the output of the tape from the upstream well, with the aid of such guiding members as 10. On the front face of the equipment, the well 4 is defined by such walls as 11 and 12 and the well 6 is defined by such walls as 13 and 14. The ends of the walls opposite to their open ends by which the tape may enter are closed and, near these closed ends, the bottom wall of the wells, consisting actually of the front wall of the equipment structure 19 (FIG. 2) is perforated by a suction hole 20 for the well 4 and 21 for the well 6. The bottom of each well is further provided with a slot, 15 for the well 4, 16 for the well 6, elongated along the main dimension of the well. As shown in FIG. 2 for the well 4, with the magnetic tape 1 forming a loop therein, each slot is connected to a chamber 22 which is tapped with a pressure sensing duct 23 which is for instance provided through a bottom plate 24 of said chamber assembled to the wall 19. Duct 23 reaches one input of a difference sensor 25 the other input of which is connected to the well by a tubulure 26 passing through the wall 19. Said difference pressure sensor has a linear response at its electrical output 27 and an adjustable leak 30 enables the adjustment of the zero in said output.

The above described arrangement constitutes a tape position sensing device, the operation of which may be stated as follows: the part of the slot 15 which is above the end of the loop of the tape 1 within the well communicates with the outer atmosphere whereas the part of the slot 15 which is under the said end is submitted to the suction ensured within the well from the motor pump 17, FIG. 4, through the duct 20. The pressure established within the chamber 22 under the slot 15 is of a value depending upon the position of the tape within the well whereas the other input of the sensor 25 receives a pressure which is the actual value of the depression created in the well from the motor pump. Consequently the sensor delivers a signal significant of the actual position of the magnetic tape within the wall. The law of evolution of the pressure within the chamber 22 with respect ot variation of position of the tape may be structurally determined and, for instance, two calibrated holes 28 and 29 may be provided near the opposite ends of said chamber and the cross section of the chamber 22 may be simultaneously empirically determined in accordance with the depth of the well for ensuring a linear relation between the difference pressure on the sensor and the position of the magnetic tape with the well. The electrical signal at 27 will consequently presents an amplitude and a sign values depending upon the position of the tape in the well.

Each one of the well is closed by a lid such as 18, FIG. 2. Said lids are removable and it is useful to have a positive information that said lids are duly applied to the wells. Said information may be obtained, as shown, by providing in the lid an electrical contact 31 which, when the lid is applied, closes an electrical circuit to a contact 32 carried by the wall 19.

Figure 1:
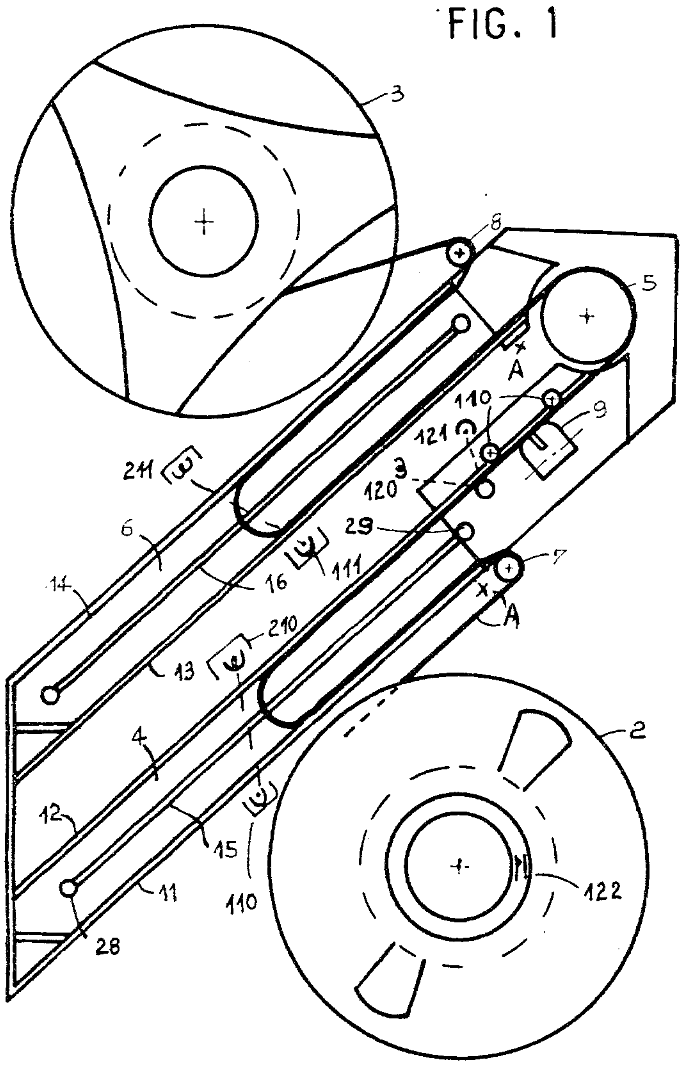
FIG. 1 shows a partial view of the front face of a magnetic tape digital recorder for a system according to the invention.

It is also useful to have a positive electrical information that the delivery coil is correctly set. Illustratively too, such an information may be obtained from the closure of an electromechanical contact 122, FIG. 1, operated by the setting of the coil upon its hub.

It is further useful to detect the mark on the magnetic tape which defines the beginning of the recordable portion of said tape. Such a mark is usually light-reflecting and, for instance, a photocell sensor such as 120 is provided just upstream of the path of the magnetic tape with respect to the block 9 of the magnetic heads. Said photocell sensor will detect the passage of the mark from the reflection therefrom of the light from a small size source 120.

Finally it is useful to have a positive information of the presence of the magnetic tape within the wells though such information may be derived from the very outputs 27 of the difference pressure sensors 25. Distinct sensors are provided in the system shown in FIG. 1, a photocell sensor 110 for the well 4, associated to a light source 210 on the other side of the well and a photocell sensor 111 for the well 6, associated to a light source 211 on the other side of the well. These sensors are represented near the middle portion of the wells. They may, if preferred, be transfered to such locations as indicated at A for the two wells, i.e., to locations nearer to the mouthes of the wells. Such photocell sensors may be omitted if desired, and manostatic sensors substituted thereto, for delivering signals analogous to those of the photocells.

Figure 3:
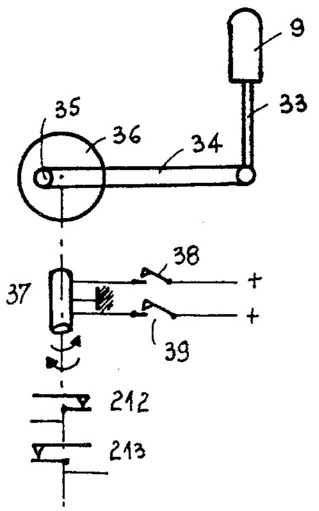
FIG. 3 shows an illustrative example of a device enabling, in a system according to the invention, a retraction of the magnetic head carrier from the path of the magnetic tape during automatic loading and unloading operations.

Though not imperative per se in practicising the invention, it may appear of advantage to have the block of magnetic heads 9 so mounted as to be retracted from the path of the magnetic tape. This may be advantageous for easing certain operations, mainly for easing the operation of loading the receiver coil with the tape. FIG. 3 illustratively shows one possible mounting of the block 9 for such a purpose. The block 9 is carried on a pivotable arm 33 and a connecting-rod 34, which may be of adjustable length, connects said arm 33 to an eccentric 35 of a disk 36 driven by the shaft of a motor 37. When the electrical supply contact 38 for said motor is closed, the motor rotates by one step and drives the block 9 to a retracted position with respect to the path of the tape. When the contact 39 is thereafter closed, contact 38 being in its open condition, the motor 37 rotates back to its normal position on the path of the tape. 212 is an end forward stroke contact which denotes, when closed, that the block 9 is retracted from the path of the tape and 213 is an end return stroke contact which denotes, when closed, that the block 9 is in its normal position along the path of the tape.

Figure 4:
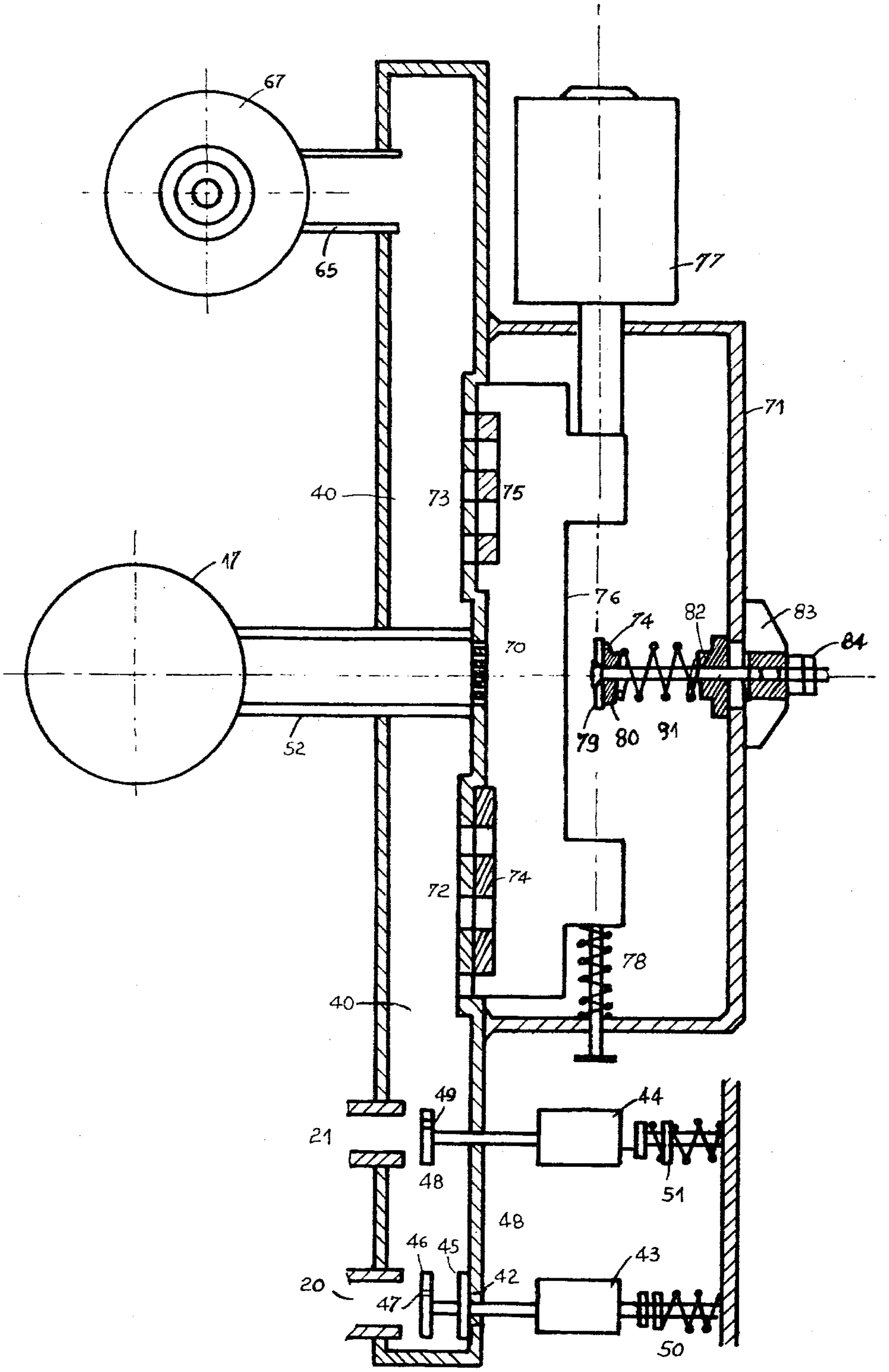
FIG. 4 shows, in a partial cross-section view, an example of a pressure control and distribution arrangement for a system according to the invention.

Referring now to FIG. 4, the suction ducts 20 of the upstream well 4 and 21 of the downstream well 6 have outlets within a chamber 40 the rear wall of which presents an outlet 42 facing the outlet 20 and connected to the outer atmosphere. Two electro-magnets 43 and 44 have their plunger members passing through said rear wall. The plunger of electro-magnet 42 passes through the outlet 42 and carries a pair of discs, a rear one 45 normally closing the outlet 42 and a front one 46 perforated by a minute hole 47 and normally retracted with respect to the suction outlet 20. The plugner of electromagnet 44 carries a single disc 48 perforated by a minute hole 49 and normally retracted with respect to the outlet 21. The retracted rest positions of the plungers may be ensured by the action of drawback springs 50 and 51. When the electro-magnet 44 is activated, the disc 48 is applied for closing of the outlet 21, the hole 49 ensuring a small leakage in the well 6. When the electro-magnet 43 is activated, the outlet 20 is similarly closed by the disc 46 but, further, the washer 45 is removed from the outlet 42 and the outer atmosphere is connected to the chamber 40. The electro-magnets may be separately or concomitantly activated according to the steps of the automatic operations to be later described: for instance, during the beginning of a loading operation, the electro-magnet 44 will be activated and, during the end of an unloading operation, both magnets will be simultaneously activated. When requested, the plunger of the electro-magnet 44 may be equiped with a rear disc cooperating with a rear wall outlet as is the plunger of the electro-magnet 43.

During an automatic loading operation, after the free end of the magnetic tape is connected to the hub of the receiver coil and, when provided, the retraction of the block of magnetic heads 9 from the path of the tape, the magnetic tape must first enter within the upstream well and thereafter within the downstream well. For ensuring the penetration of the tape within the upstream well, it is useful that the downstream well be in a condition of reduced suction and consequently actuation of the electro-magnet 44 will produce this reduction from application of the disc 48 on the outlet 21. Once this actuation cancelled on the formation of the loop of the magnetic tape within said upstream well, the suction is re-established within the downstream well so that the magnetic tape may enter said well and forms the wanted loop therein.

On the other hand, during the unloading operation, an increased speed is ensured for re-winding the tape on the delivery coil and, near the end of the operation, both wells must be placed in a reduced suction condition so that the tape may escape the wells without its end being first violently sucked in the upstream well and maintained applied on a wall of the downstream well, which will surely deteriorate this end part of the tape. Consequently, it is useful that both the electromagnets 43 and 44 be activated and both the wells 4 and 6 connected to the outer atmosphere through their suction ducts.

Without any further consideration, the chamber 40 could be directly connected to the main suction duct 52 of the motor pump. In order however to further automatize the operation of loading the tape on the receiver coil, it is of advantage to provide said receiver coil with a "suction" hub too so that the operator does not have the imperative of positively clamping the free end of the tape to the said hub but merely have to present said free end to said hub, which will then be sucked by said hub for maintaining it at least during some first turns of the tape on the receiver coil.

Figure 5:
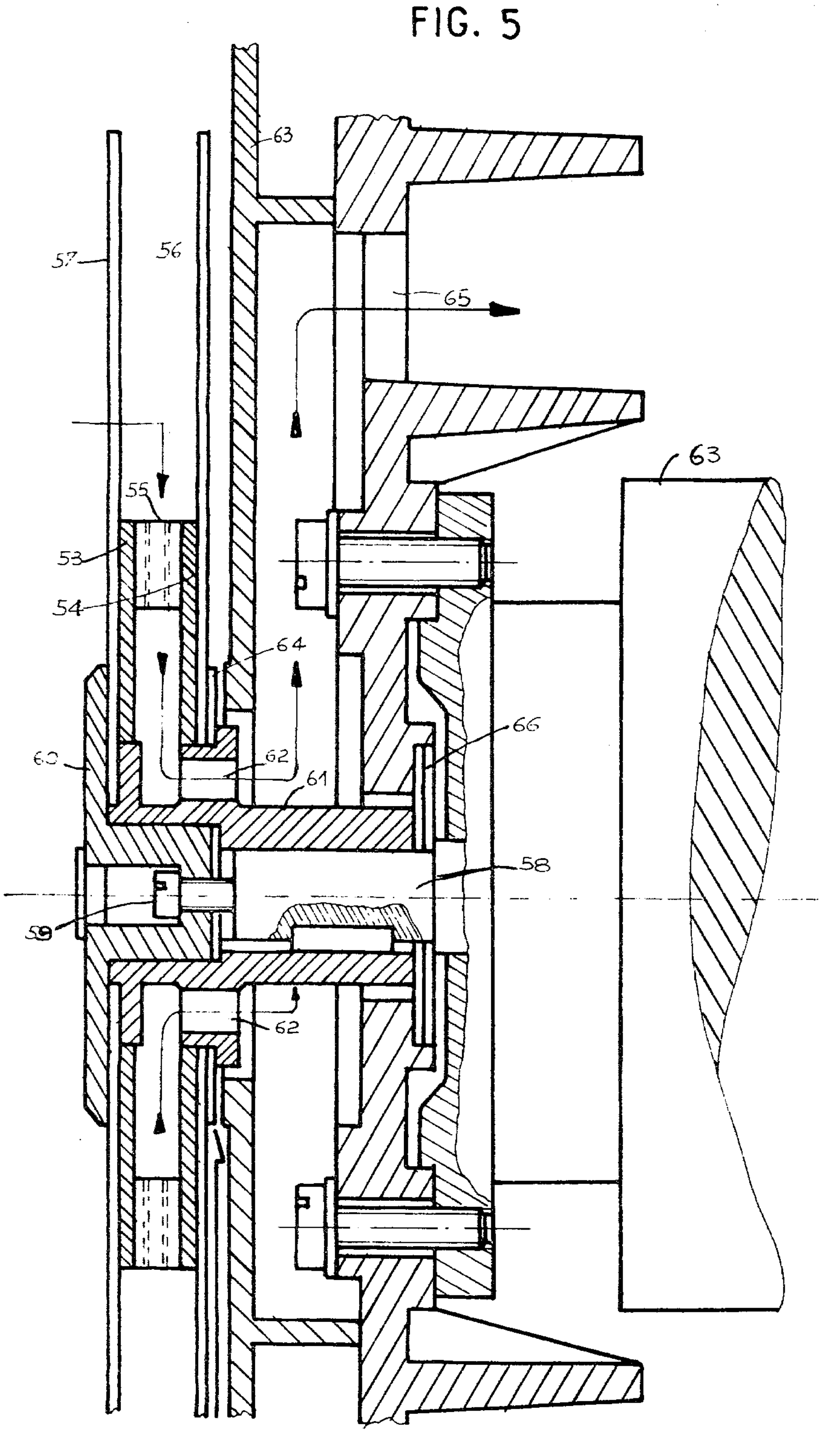
FIG. 5 shows an illustrative embodiment of a suction hub mounting for a receiver coil in a system according to the invention.

Such a sucking hub, FIG. 5, comprises between two washers 53 and 54, in a light metal alloy for instance, a stack 55 of radially grooved rings, of a plastic material for instance, said grooves ensuring the passage of the air through the stack. Said hub is clamped between a pair of brackets 56 and 57 for constituting together a receiver coil when, mounted on a sleeve 61 provided with ducts such as 62, said sleeve is connected to the drive motor 63. Said connection may be made by a screw 59 pressing a flange 60 on the coil against annular washers 64 constituting a sliding joint for the rotation of the coil with respect to the wall of the framework of the equipment. The suction duct for said hub is shown at 65. The airtigthness of the motor may be ensured by means of flexible washers 66.

Such a hub, marked 67 in FIG. 4, has its suction duct 65 with an outlet in the said chamber 40 and the suction duct 52 of the motor pump 17 reached the rear wall of said chamber 40 for communication through perforations 70 with an additional chamber defined by an auxiliary casing 71. The duct 52 divides the chamber 40 into two separate volumes, one communicating with the outlets 20 and 21, and the other one communicating with the outlet of 65. Said volumes communicate with the rear chamber through respective perforated portions 72 and 73 of the rear wall of the chamber 40. A sliding-valve arrangement is provided for closing either the perforated portion 72 or the perforated portion 73 of the rear wall. The sliding valves 74 and 75 of said arrangement are supported by a brace 76 secured to the plunger member of an electro-magnet 77. When said electro-magnet is unactivated, which is the case of the drawing, the main suction duct 52 communicates with the lower volume of the chamber 40, the two outlets 20 and 21 are submitted to the depression (when magnets 43 and 44) are at rest). When magnet 77 is energized, the brace 76 is pressed downwards against the action of the spring 78 and the upper volume of the chamber 40 is submitted to the depression in the main suction duct 52, the sucking hub 67 is operative for maintaining the free end of a tape thereon.

In order to better adapt the operative conditions of an automatic loading and unloading control system according to the invention, a certain degree of automatic regulation of the pressure in the main suction duct 52 may be provided as shown in FIG. 4. A disc 79 is maintained by a rod 80 carrying a spring 81 applying a further disc 82 on an aperture of the rear wall of the casing 71, the disc 79 facing the perforated portion 70 of the rear wall of the chamber 40. The spacing between said portion 70 and said disc 79 is externally adjusted, for instance by means of a taring screw 84, acting on the end of the rod 80 passing through a carrier block 83 externally secured to said rear wall of the casing 71. When the pressure within the auxiliary casing and consequently the pressure within the duct 52 falls lower than the thus determined threshold, the outer atmosphere pressure may act upon the disc 82 to repel said washer at a more or less improtant degree so that the pressure is varied through the aperture in the casing 71 within the rear chamber and consequently within the main suction duct 52. Preferably the front plane of the disc 79 is adjusted in relatively closed proximity to the perforated portion 70 of the rear wall of the chamber 40. Each time such a leakage will occur, the device will automatically reinstate the first condition as soon as the pressure within the auxiliary chamber will be sufficiently increased from such a leakage of outer atmosphere therein.

Figure 6:
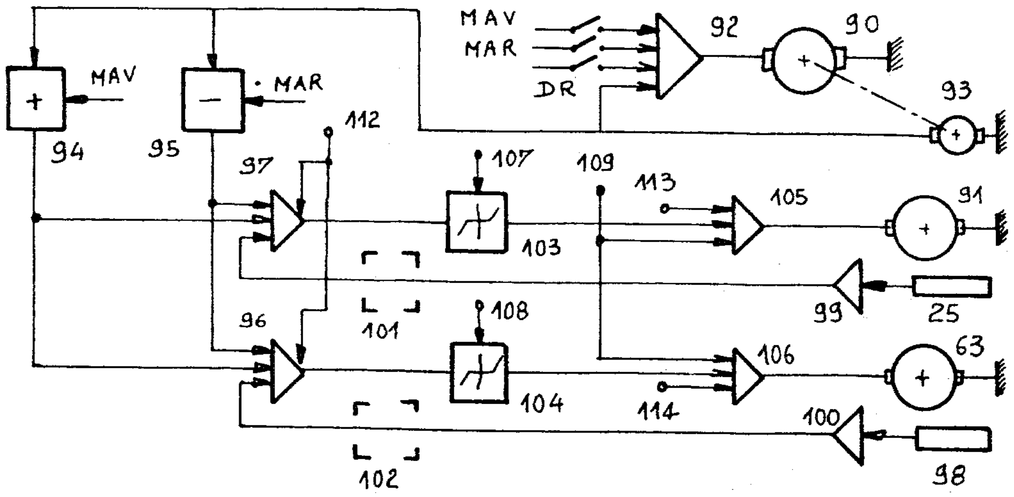
FIG. 6 shows an illustrative embodiment of the servo-systems controlling the rotations of the delivery and receiver coils in a system according to the invention; and, FIG. 7 respectively shows in its part a) and b) examples of automatic sequence control circuits for respectively loading and unloading the receiver coil in a system according to the present invention.

FIG. 6 shows the servo-systems for controlling the rotations of the motors: 90 for the capstan, 91 for the delivery coil and 63 for the receiver coil, said servo-systems being adapted to the automatic control system according to the invention. The control of the capstan drive motor is conventional per se, comprising a servo-amplifier 92 one input of which is connected to the output of a tachometer dynamo 93 driven from said motor and another input of which receives, as the case may be, a forward rotation control voltage MAV or a backward rotation control voltage MAR or, further the increased speed control voltage DR (for rewinding the tape on the delivery coil).

Two gates 94 and 95 receives the tachometer voltage from 93. The gate 94 is unblocked for a forward rotation condition of the capstan and delivers the tachometer voltage at its output with a positive polarity. The gate 95 is unblocked for a backward rotation of the capstan and delivers the tachometer voltage at its output with a negative polarity. The outputs of said gates are connected to inputs of operational amplifiers 96 and 97 of the servo-system. The operational amplifier 96 is intended to control, through a power amplifier 106, the rotation of the receiver coil driving motor 63. The operational amplifier 97 is intended to control, through a power amplifier 105, the rotation of the delivery coil driving motor 91. Theservo-signal for the amplifier 96 is the signal from the sensor 98 associated to the downstream well 6, said signal being amplifier by an amplifier 100. The servo-signal for the amplifier 97 issues from the sensor 25 associated to the upstream well 4, said signal being amplified by an amplifier 99. The signals from the sensors reproduce, in analog representations, the positions of the loops of the magnetic tape within the wells. Between the amplifier 97 and the power amplifier 105 is inserted a threshold circuit 103, the threshold value of which is controlled from an electrical input 107. Between the amplifier 96 and the power amplifier 106 is inserted a threshold circuit 104, the threshold value of which is controlled from an electrical input 108. The threshold values are normally adjusted so that, when the sensors do not deliver any signals and signals of too low amplitudes that the outputs of the operational amplifiers may, in normal amplification conditions thereof, outpass such threshold values, the corresponding motors 63 and 91 cannot be rotated. In such conditions of the sensor outputs however, the threshold values may be outpassed when, for certain steps of operation, and under an application of a suitable control voltage at 112, the amplification rates of the operational amplifiers 96 and 97 are suitably increased in this respect.

When an additional control input 109 for the power amplifiers is activated, the power rates of said amplifiers 105 and 106 are increased, resulting in an increase of the voltage value applied to the motors 63 and 91. Such a condition will be used for controlling an increased speed of re-winding of the tape on the delivery coil when the control input DR of the capstan motor 90 is equally activated.

The power amplifiers 105 and 106 are further respectively provided with additional control inputs 113 and 114. These inputs are used, when useful and for certain steps of the automatized operations, as it will be herein below described, for controlling a rotation of the motors independantly of the servo-operational amplifier controls. The rotation of the motor 63 will thus be controlled during the beginning of an automatic loading operation of the tape on the receiver coil in order to perfect the connection of the free end of the tape to said coil. The rotation of the motor 91 will be similarly controlled during a short time interval after the rotation of the motor 63 in order that the delivery coil may rotate as a depression is created within the well 4 for eliminating the friction inertia of the delivery coil during the penetration of the magnetic tape within the upstream well.

Two additional circuits may be, when required, inserted between the sensor amplifiers 99 and 100 and the operational amplifiers 97 and 96, at locations such as 101 and 102. When such circuits are provided, they consist of function translators set to such empirical laws as increasing the servo-loop amplifications when the magnetic tape reaches the ends of the wells: such a control maintains the servo-loop stabilities for any penetration of the magnetic tape within the wells and for any charge in magnetic tape of the coil associated to the well of which the sensor measures the filling with a loop of magnetic tape.

Figure 7:
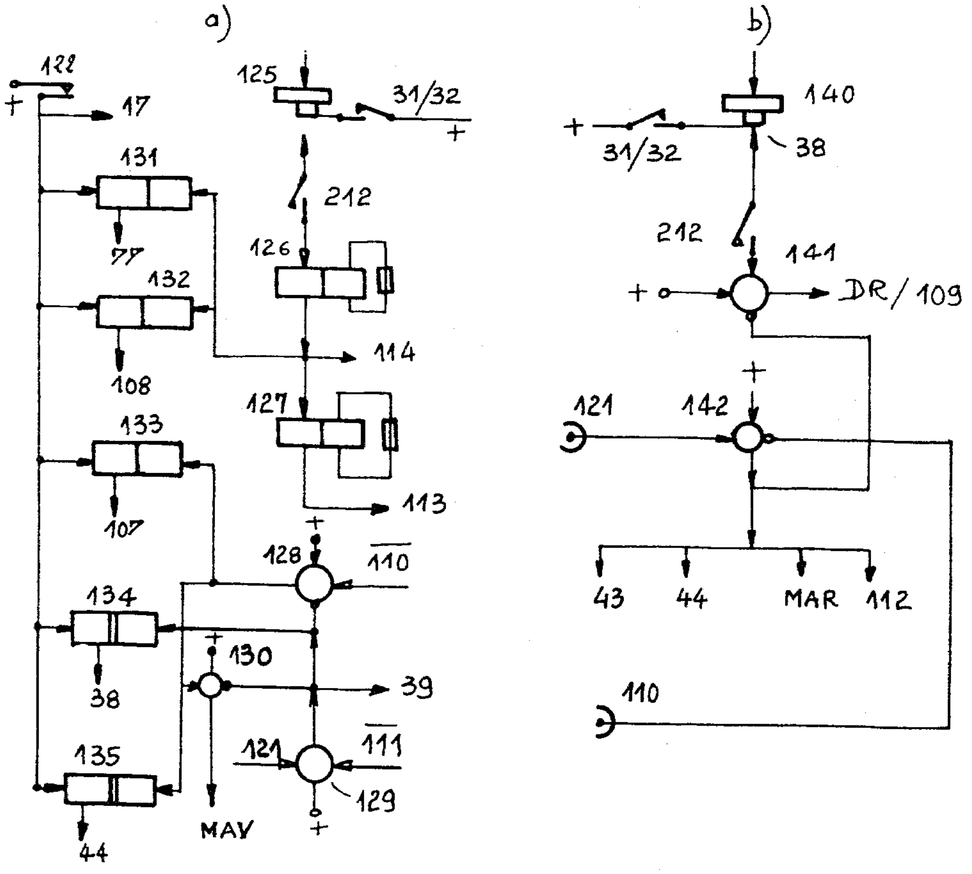

The above described system is controlled from automatized programmed sequences which will now be detailed with reference to the sequence organization disclosed in FIG. 7. FIG. 7 a) shows the organization of the sequence control circuits for automatically loading the receiver coil with the magnetic tape from the delivery coil and FIG. 7 b) similarly shows the organization of the sequence control circuits for automatically unloading the magnetic tape from said receiver coil.

When a new and loaded delivery coil is set in the equipment, contact 122 is closed and, further to the activation of the motor-pump, said closure activates a number of one-digit stores, each shown as a bistable circuit, from 131 to 135. The activation of the bistable circuit 131 controls the activation of the electro-magnet 77, consequently applying the suction from the main suction duct to the sucking hub of the receiver coil. The bistable circuits 132 and 133 apply the threshold voltages 107 and 108 to the circuits 103 and 104 in order to "disconnect" the power amplifiers 105 and 106 from the operationsl amplifiers 97 and 96. The bistable circuit 134 closes the contact 38 and the motor 37 rotates by one step for retracting the block 9 of magnetic heads from the path of the magnetic tape, contact 212 being closed. Finally, the bistable circuit 135 activates the electro-magnet 44, consequently obturating the suction duct 21 of the downstream well which is thus connected to the outer atmosphere since the magnetic tape has not formed a loop therein.

The operator takes the free end of the magnetic tape from the delivery coil and presents said free end to the sucking hub of the receiver coil, which ensures a temporary fixation of the tape to said coil. Thereafter the operator pushes a push-button 125 for starting the automatic loading operation proper. When the lid of the wells is correctly set, the contact 31/32 is closed and when the block 9 is correctly retracted, the contact 212 is closed. The action of the operator on the push-button 125 activates a temporized circuit 126, shown as a one-shot circuit, which applies at 114 a voltage which, through the power amplifier 106 controls a rotation of the motor 63 driving the receiver coil. This rotation is a temporary one as, on the return to rest of the one-shot circuit 126 said voltage is cut at 114. The return to rest of 126 further resets to rest the bistable circuits 131 and 132, consequently cancelling the suction on the hub of the receiver coil and applying the suction to the upstream well and cancelling the voltage which at 108 blocked the servo-loop for the receiver coil. Concomitantly too, the return to rest of 126 activates a cascaded one-shot circuit 127 which, in turn, applies a control voltage to the power amplifier 103 for rotating the delivery coil. Said rotation will last a sufficient time interval to permit the formation of the loop of the magnetic tape within the upstream well. When said loop is obtained, the photocell sensor 110 does not receive any more light from the source 210. This occultation signal $\overline{110}$ unblocks a gate 128 the output voltage of which resets the bistable circuits 133 and 135, consequently cancelling the voltage at 107 and returning the delivery coil control servo-loop normally operative and resetting to rest the electro-magnet 44: the downstream well is now submitted to the suction from the motor pump. Simultaneously, the output of 128 unblocks a gate 130 which applies an operative voltage on the inputs MAV of FIG. 6. The capstan motor 90 is rotated and the gate 94 is unblocked. The magnetic tape is normally driven by the capstan and the loop of the magnetic tape in the upstream well is maintained from its operative servo-loop control. The magnetic tape enters within the downstream well and forms a loop in this well, consequently interrupting the light on the photocell 111. Said photocell issues an occulation condition signal $\overline{111}$. When thereafter the reflecting mark appears on the tape, the photocell 121 is energized and the gate 129 is unblocked, a condition which:

firstly blocks the gate 130, then stopping the drive of the tape from the capstan;

secondly resets the bistable circuit 134, thus opening the contact 38;

thirdly blocks the gate 128, and finally, closes the contact 39, activating the motor 37 to reset the block 9 of magnetic heads in the path of the magnetic tape. Contact 213 is closed and may actuate a signalling lamp.

The automatic loading operation of the receiver coil is consequently terminated.

FIG. 7 b) shows the sequence for an automatic operation of the receiver coil. When the operator presses the push-button 140 and when the lids of the wells are correctly set, contact 38 is closed, which controls the retraction of the block 9 of magnetic heads from the path of the tape (when provided). Contact 212 closes and a gate 141 is unblocked which applies an operative voltage on both inputs DR (speedy re-winding) and 109 (increased amplification rates of the power amplifiers 105 and 106). Simultaneously the inputs MAR of the capstan circuit and of the servo-circuits is activated (such an activation may occur as soon as the push-button 140 is pressed by the operator). The rewinding of the tape on the delivery coil is thus made at a higher speed until the reflecting mark on the tape activates the photocell 121, the output signal of which then unblocks a gate 142. The output of this gate blocks the gate 141, the rewinding operation is slowed, leaving MAR solely in force. Further the depression is suppressed within both wells 4 and 6 from the simultaneous operations of the electro-magnets 43 and 44, which applies the outer atmosphere to the chamber 40. Concomitantly, the amplification rates of both the servo-operational amplifiers 96 and 97 are increased by the control at 112 so that the motors 63 and 91 may still rotate with their respective servo-systems remaining operative to control said rotations. When, finally, the photocell 110 is activated, which indicates that the magnetic tape is no more within the upstream well, the signal 110 from said photocell blocks the gate 142. The automatic unloading operation is terminated.

What is claimed is:

1. In an automatic control system for loading and unloading a magnetic tape receiver spool in digital recording equipment of the type which includes a tape driving capstan, an upstream well between a tape delivery spool location of the equipment and said capstan, a downstream well between the capstan and the tape receiver spool location, linear response sensors to detect the positions of the tape within the wells, spool rotation servo-systems responsive to said sensors for maintaining the magnetic tape at determined depths within the wells, each one of the servo-systems including at least one operational amplifier, a suction duct arrangement including a section in fluid communication with the respective outlets of the wells, and receiver spool load and unload sequence control electrical means, the improvement comprising:

first individually electrically controllable means for controlling fluid communication of said outlets with said section of the duct arrangement;

second electrically controllable means for controlling fluid communication of said section of the duct arrangement with the atmosphere;

means in said load and unload sequence control means operable when activated to condition the said first controllable means to block communication to the outlet of the downstream well during the beginning of a load operation up to the sensing of the magnetic tape within the upstream well; and, means in said load and unload sequence control means operable when activated to condition the said second controllable means to establish fluid communication of said section of the duct with the atmosphere during an unloading operation prior to the release of the magnetic tape from the receiver spool.

2. System according to claim 1, wherein a magnetic head carrier is retractably mounted in the path of the tape together with retraction control means during at least an automatic tape loading operation of the receiver coil.

3. System according to claim 1, wherein first magnetic tape presence and default sensor means is associated to the said upstream well and second magnetic tape presence and defult sensor means is associated to the said downstream well and wherein, during an automatic loading operation, means are activated from the said first means sensing the presence of the magnetic tape within the upstream well for temporarily activating the depression reduction control means associated to the downstream well and means are activated from the said second means sensing the presence of the magnetic tape within the downstream well for controlling means stopping the said automatic loading operation, and wherein, during an automatic unloading operation, means are activated from the said second means when sensing the absence of the magnetic tape within the upstream well for controlling means stopping the said automatic unloading operation.

4. System according to claim 1, wherein each of said outlet communication control means comprises an electromechanically controlled obturator member having a minute hole therethrough and said communication control means to the atmosphere comprises an obturator member cooperating with a wall of said section.

5. System according to claim 4, wherein the obturator member of the communication control means to the atmosphere is mechanically linked to the obturator member cooperating with the outlet of the upstream well.

6. System according to claim 1, wherein the duct arrangement comprises a main suction duct having an outlet to an intermediate chamber connected to the section of the duct containing the outlets of the wells through slide-valve means controllable for separating said chamber from said section during an initiating period of loading operation of the receiver spool.

7. System according to claim 6, wherein a further suction section from said intermediate chamber is connected to a suction hub for the receiver spool and said slide-valve means connects said further section to said main suction duct in reversed relation with the connection condition of the said intermediate chamber to the said duct section containing the outlets of the wells.

8. System according to claim 6, wherein spring biased atmosphere responsive means is provided for regulation of the output from said main suction duct, said means having an obturator member closely facing the outlet of said duct and an obturator member cooperating with an aperture in the wall of said intermediate chamber, said spring bias being adjusted for atmosphere leakage into said chamber when suction conditions vary within the said intermediate chamber.

9. System according to claim 1, wherein means responsive to an off-communication condition in at least one of the wells controls an increase of the amplification ratios of the said operational amplifiers.

10. System according to claim 9, wherein said means includes sensor means responsive to the passage at a mouth of a well, during an automatic unloading operation, of the start record mark on the tape and means responsive to the activation of said sensor means for simultaneously increasing the amplification ratios of the operational amplifiers and controlling to on-communication condition the communication means of the duct section to the atmosphere.

11. System according to claim 10, wherein means are provided for increasing the amplification ratios of the operational amplifiers during an automatic unloading operation and means controlled from said sensor means for reducing back the said amplification ratios when said sensor means are activated.

12. System according to claim 1, wherein means responsive to a default of magnetic tape within the wells inhibits the normal operation of said servo-systems and applies predetermined control voltages to said servo-systems.

13. System according to claim 12, wherein said last mentioned means comprises threshold circuits respectively inserted between operational and power amplifiers in said servo-systems, means controlled from said default of magnetic tape within the wells for concomitantly raising the threshold values of said circuits and applying calibrated control voltages to said power amplifiers and means ensuring delayed cancellations of said raise of threshold values and of said control voltages.

14. System according to claim 13, wherein said threshold raising means and said control voltage applying means are activated from the closure of an electromechanical contact actuated by the setting of the receiver spool in the equipment.

* * * * *